United States Patent
Melchin et al.

(10) Patent No.: US 10,227,726 B2
(45) Date of Patent: Mar. 12, 2019

(54) WATER-REDISPERSIBLE POLYMER POWDERS FOR CARPET COATING COMPOSITIONS

(71) Applicant: Wacker Chemie AG, Munich (DE)

(72) Inventors: Timo Melchin, Mehring (DE); Ulf Dietrich, Burghausen (DE); Holger Kuenstle, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/534,744

(22) PCT Filed: Dec. 10, 2015

(86) PCT No.: PCT/EP2015/079321
§ 371 (c)(1),
(2) Date: Jun. 9, 2017

(87) PCT Pub. No.: WO2016/092047
PCT Pub. Date: Jun. 16, 2016

(65) Prior Publication Data
US 2017/0321375 A1    Nov. 9, 2017

(30) Foreign Application Priority Data
Dec. 12, 2014    (DE) .................. 10 2014 225 773

(51) Int. Cl.
| | | |
|---|---|---|
| *D06N 7/00* | (2006.01) | |
| *C09D 131/04* | (2006.01) | |
| *C09D 133/08* | (2006.01) | |
| *C09D 129/04* | (2006.01) | |
| *C08K 3/26* | (2006.01) | |
| *C08K 3/36* | (2006.01) | |
| *C08K 5/41* | (2006.01) | |
| *A47G 27/02* | (2006.01) | |
| *C09D 7/61* | (2018.01) | |
| *C09D 7/63* | (2018.01) | |

(52) U.S. Cl.
CPC .......... *D06N 7/0073* (2013.01); *A47G 27/02* (2013.01); *C08K 3/26* (2013.01); *C09D 7/61* (2018.01); *C09D 7/63* (2018.01); *C09D 129/04* (2013.01); *C09D 131/04* (2013.01); *C09D 133/08* (2013.01); *C08K 3/36* (2013.01); *C08K 5/41* (2013.01); *C08K 2003/265* (2013.01); *C08L 2205/025* (2013.01); *D06N 2203/041* (2013.01); *D06N 2203/042* (2013.01); *D06N 2203/045* (2013.01); *D06N 2203/047* (2013.01); *D06N 2203/048* (2013.01); *D06N 2205/10* (2013.01)

(58) Field of Classification Search
CPC .......... D06N 7/0073; D06N 2203/041; D06N 2203/042; D06N 2203/045; D06N 2203/047; D06N 2205/10; D06N 2203/048; C09D 129/04; C09D 131/04; C09D 133/08; C09D 7/1233; C08K 5/41; C08K 3/36; C08K 3/26; C08K 2003/265
See application file for complete search history.

(56) References Cited

U.S. PATENT DOCUMENTS

| | | |
|---|---|---|
| 3,779,799 A | 12/1973 | Kennedy et al. |
| 4,239,563 A | 12/1980 | Iacoviello |
| 4,735,986 A | 4/1988 | Iacoviello |
| 4,921,898 A | 5/1990 | Lenney et al. |
| 5,026,765 A | 6/1991 | Katz et al. |
| 5,994,438 A * | 11/1999 | Geissler ................. C09J 125/14 524/272 |
| 6,084,018 A * | 7/2000 | Wildburg ............. C09J 133/064 524/424 |
| 6,359,076 B1 | 3/2002 | Lunsford et al. |
| 2012/0009379 A1 * | 1/2012 | Muller .................. C08F 218/08 428/96 |
| 2012/0077907 A1 | 3/2012 | Lazarus et al. |

FOREIGN PATENT DOCUMENTS

| | | |
|---|---|---|
| DE | 19613931 A1 | 10/1997 |
| EP | 0838509 A2 | 4/1998 |
| GB | 1298155 A | 11/1972 |
| WO | 9000967 A1 | 2/1990 |
| WO | 9910396 A1 | 3/1999 |
| WO | 2006007157 A1 | 1/2006 |
| WO | 2009099717 A2 | 8/2009 |
| WO | 2010089142 A1 | 8/2010 |
| WO | 2011139267 A1 | 11/2011 |
| WO | 2011140065 A2 | 11/2011 |
| WO | 2012020319 A2 | 2/2012 |
| WO | 2012020321 A2 | 2/2012 |
| WO | 2013001379 A2 | 1/2013 |
| WO | 2013093547 A1 | 6/2013 |
| WO | 2013123210 A1 | 8/2013 |
| WO | 2013171584 A1 | 11/2013 |
| WO | 2014031579 A2 | 2/2014 |

OTHER PUBLICATIONS

Fox T. G., Bull. Am. Physics Soc. 1, 3, p. 123 (1956).
Polymer Handbook 2nd Edition, J. Wiley & Sons, New York (1975).

* cited by examiner

*Primary Examiner* — Robert Harlan
(74) *Attorney, Agent, or Firm* — Brooks Kushman P.C.

(57) ABSTRACT

The use of redispersible polymer powders containing no organic emulsifier for a binder in the production of carpeting is surprisingly superior to use of the same polymers in the form of an aqueous dispersion. Tuft removal force in particular, is improved. The compositions contain no thickener, or a reduced level of thickener.

10 Claims, No Drawings

WATER-REDISPERSIBLE POLYMER POWDERS FOR CARPET COATING COMPOSITIONS

CROSS REFERENCE TO RELATED APPLICATIONS

This application is the U.S. National Phase of PCT Appln. No. PCT/EP2015/079321 filed Dec. 10, 2015, which claims priority to German Application No. 10 2014 225 773.5 filed Dec. 12, 2014, the disclosures of which are incorporated in their entirety by reference herein.

BACKGROUND OF THE INVENTION

1. Field of the Invention

The invention relates to the use of polymers based on ethylenically unsaturated monomers in carpet coating compositions, to corresponding carpet coating compositions, and also to carpets coated with such carpet coating compositions.

2. Description of the Related Art

Carpets, for example continuous-sheet product or carpet tiles, are manufactured by forming the carpet pile from tufts inserted, for example in the form of loops, into a woven or non-woven primary backing. In tufted carpet, the sheetlike primary backing holds the loops but loosely. Needlefelt carpets are manufactured by needling the tufts. In woven carpets, the tufts are interwoven with the primary backing.

To improve the attachment of the carpet pile to the sheetlike primary backing, a binder is applied to the reverse side of the primary backing. Aqueous types of polymer dispersions may be precoated as a foam or in the unfoamed state, for example. Such aqueous types of polymer dispersions may be filled with fillers, for example chalk, and may optionally contain further added substances, such as thickeners, dispersing auxiliaries or foaming auxiliaries. To improve their dimensional stability, the carpet products thus obtained may be provided with a further, secondary backing. The secondary backing generally comprises a woven fabric in a manufactured fiber such as polypropylene, polyamide or polyester, or in a natural fiber such as jute. The secondary backing is attached to the as-precoated carpet by further applying a binder. Again, aqueous types of polymer dispersions filled with fillers, for example chalk, may contain further additives such as thickeners and may be applied as a foam or in the unfoamed state to form a secondary coating.

WO 90/00967 A1 describes the use of aqueous dispersions of vinyl acetate-ethylene copolymers or of styrene-butadiene copolymers or of styrene-acrylate copolymers instead of PVC plastisol as binders in carpet manufacture. U.S. Pat. No. 3,779,799 describes the manufacture of a tufted carpet precoated with a binder composition where the binder is a vinyl acetate-ethylene copolymer dispersion (VAE copolymer dispersion) or a polyethylene dispersion or a dispersion of a carboxylated styrene-butadiene copolymer. U.S. Pat. No. 5,026,765 describes a carpet coating composition comprising a vinyl acetate-ethylene copolymer dispersion wherein the copolymer further contains monomer units whose homopolymers have glass transition temperatures Tg of at least 50° C. U.K. patent GB 1,298,155 describes carpet coating compositions comprising a crosslinkable binder based on an aqueous mixture of vinyl acetate-ethylene copolymer, polyvinyl alcohol (PVOH) and glyoxal. WO 2010/089142 A1 discloses a vinyl acetate-ethylene copolymer dispersion employed as a binder in carpet manufacture. The copolymer contains 1 to 4 wt % of ethylene and is emulsifier stabilized only, although small amounts of protective colloid may be co-used for stabilization if necessary. To improve adherence to polyvinyl butyral sheeting (as secondary backing), WO 2006/007157 A1 proposes employing a vinyl acetate-ethylene copolymer further comprising from 1 to 10 wt % of comonomer units containing functional groups such as carboxyl, amide, N-methylol or hydroxyalkyl groups. The copolymer is prepared by employing a mixture of emulsifier and from 0.05 to 4 wt % of protective colloid. U.S. Pat. No. 6,359,076 proposes improving the water resistance of carpet coatings by employing crosslinkable vinyl acetate-ethylene copolymers which include OH-functional monomer units in combination with a crosslinker. WO 2011/139267 A1 and WO 2011/140065 A2 teach carpet coatings based on vinyl acetate-ethylene copolymers, which contain functional, crosslinkable comonomer units, such as silane-functional or multifunctional comonomers, and not protective colloids but emulsifiers for stabilization. WO 2012/020319 A2 and WO 2012/020321 A2 disclose carpets notable for low flammability or good washability. The binder used was a vinyl acetate-ethylene copolymer dispersion having an average particle size dw of 50 to 500 nm, established by polymerization under emulsifier stabilization, although up to 3% of protective colloid may additionally be used as a costabilizer if necessary. WO 2013/093547 A2 relates to a carpet binder having an optimized composition for formulations with carbon black as a filler. The binder comprises a vinyl acetate-ethylene copolymer dispersion stabilized with emulsifier and cellulose ether. WO 2013/123210 A1 relates to carpets manufactured by employing a binder mixture formed from a vinyl acetate-ethylene copolymer dispersion and from a styrene-butadiene copolymer dispersion. A proposal to improve the compatibility of the two different polymer dispersions involves eschewing polyvinyl alcohol in the VAE dispersion, and at most employing up to 1.5 wt % of polyvinyl alcohol, based on comonomers, as a protective colloid in the preparation thereof. WO 2014/031579 A2 relates to a carpet coating composition which by way of binders may include inter alia a VAE dispersion which is emulsifier stabilized and may additionally contain up to 1.5 wt % of polyvinyl alcohol as a costabilizer if necessary. This dispersion is blended with an alpha-olefin-carboxylic acid copolymer and a crosslinker. WO 99/10396 A1 proposes improving the rheology of VAE dispersions having a high solids content of at least 65 wt % by preparing them in the presence of a stabilizer mixture formed of more than 3 wt %, preferably 4 to 5 wt % of low molecular weight polyvinyl alcohol and 1 to 4 wt % of a nonionic emulsifier having a defined HLB (hydrophilic-lipophilic balance). WO 2013/001379 A2 describes polyvinyl alcohol-stabilized VAE dispersions. To optimize their viscosity, the stabilizing polyvinyl alcohol used comprises a mixture of 0.5 to 3 wt % of fully hydrolyzed polyvinyl alcohol and 1.5 to 4 wt % of partially hydrolyzed polyvinyl alcohol. U.S. Pat. No. 4,921,898 relates to aqueous adhesive compositions based on a vinyl acetate-ethylene copolymer dispersion prepared in the presence of a stabilizer combination of 2 to 4 wt % of a low molecular weight polyvinyl alcohol with 2 to 4 wt % of an emulsifier. The adhesive composition is notable for rapid setting. U.S. Pat. No. 4,239,563 describes aqueous vinyl acetate-ethylene copolymer dispersions useful as binders for consolidating carpets. The lower emission of volatile organic compounds (VOCs) versus styrene-butadiene latices is emphasized. The VAE dispersion is prepared via emulsion polymerization by use of emulsifier and/or protective colloid (inter alia polyvinyl alcohol). The VAE copolymer has an ethylene content of 30 to 80 wt %, based on total comonomers. U.S. Pat. No. 4,735,986 by way of prior art for carpet binders describes a composition comprising a vinyl acetate-ethylene copolymer dispersion stabilized with 5 wt % of polyvinyl alcohol, wherein the polyvinyl alcohol fraction comprises a mixture of a low-viscosity partially hydrolyzed PVOH and a medium-viscosity partially hydrolyzed PVOH. Disadvantages are stated to be an insufficient level of filler compatibility, the lack of compatibility with chalks of differing specification and the low compatibility with styrene-butadiene copolymer dispersions. The property profile is said to be improved on polymerizing in the presence of a stabilizer mixture of partially hydrolyzed PVOH, fully hydrolyzed PVOH and a nonionic polyalkoxylated emulsifier.

Yet there continues to be a need for binders capable of improving the dry strength of carpets. There is also a need for carpet coating composition binders having superior compatibility with fillers, for example with chalk, especially in the case of highly filled formulations. The aforementioned issue with filler compatibility arises especially on using polymer dispersions as a binder which are solely stabilized with polyvinyl alcohol. True, the co-use of emulsifiers during the polymerization or the subsequent admixture of emulsifiers to the polymer dispersions does improve the filler compatibility of an aqueous vinyl acetate-ethylene copolymer dispersion, yet the admixture of emulsifiers also degrades the mechanical strengths of the coating obtained therewith.

The problem addressed by the present invention was therefore that of providing carpet coating composition binders capable of improving the dry strength of carpets. Filler compatibility should ideally also be improved, especially with regard to chalk and/or especially in the case of highly filled formulations. Highly filled formulations contain for example up to 1000 wt % of filler, based on the binder. The dry strength and the aforementioned filler compatibility should ideally be increased at one and the same time. All this should also be attainable if necessary with emulsifier-free binders. The aforementioned objectives should ideally be achieved on employing the binders for carpet coating compositions as precoat and/or as secondary coating.

SUMMARY OF THE INVENTION

The invention provides for the use of polymers based on ethylenically unsaturated monomers in carpet coating compositions, characterized in that the carpet coating compositions are prepared using one or more polymers based on ethylenically unsaturated monomers in the form of water-redispersible powders (polymer powder).

DETAILED DESCRIPTION OF THE PREFERRED EMBODIMENTS

The polymers are preferably based on one or more ethylenically unsaturated monomers selected from the group comprising vinyl esters, (meth)acrylic esters, vinylaromatics, olefins, 1,3-dienes and vinyl halides.

Suitable vinyl esters are, for example, vinyl esters of carboxylic acids having 1 to 22 carbon atoms, especially 1 to 12 carbon atoms. Preference is given to vinyl acetate, vinyl propionate, vinyl butyrate, vinyl 2-ethylhexanoate, vinyl laurate, vinyl myristate, vinyl palmitate, vinyl stearate, vinyl arachidate, 1-methylvinyl acetate, vinyl pivalate and vinyl esters of α-branched monocarboxylic acids having 9 to 13 carbon atoms, for example VeoVa EH, i.e., the vinyl esters of 2-ethylhexanoic acid, VeoVa9® or VeoVa10® (trade names of Resolution). Vinyl acetate is particularly preferable.

Suitable acrylic esters or methacrylic esters are, for example, esters of branched or unbranched alcohols having 1 to 22 carbon atoms, especially 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, lauryl acrylate, myristyl acrylate, stearyl acrylate, palmityl acrylate, lauryl methacrylate, myristyl methacrylate, stearyl methacrylate or palmityl methacrylate. Particular preference is given to methyl acrylate, methyl methacrylate, n-butyl acrylate, t-butyl acrylate or 2-ethylhexyl acrylate.

Styrene, methylstyrene and vinyltoluene are preferred vinylaromatics. Vinyl chloride is the preferred vinyl halide. Ethylene and propylene are the preferred olefins while 1,3-butadiene and isoprene are the preferred dienes.

An additional 0.1 to 10 wt % of auxiliary monomers, based on the total weight of the monomer mixture, is optionally copolymerized. Auxiliary monomers are preferably employed at from 0.5 to 5 wt %. It is particularly preferred not to copolymerize any auxiliary monomers.

Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric and maleic acid such as the diethyl and diisopropyl esters, and also maleic anhydride, ethylenically unsaturated sulfonic acids and/or salts, preferably vinylsulfonic acid, 2-acrylamido-2-methylpropanesulfonic acid. Further examples are precrosslinking comonomers such as polyethylenically unsaturated comonomers, examples being divinyl adipate, diallyl maleate, allyl methacrylate or triallyl cyanurate; or postcrosslinking comonomers, examples being acrylamidoglycolic acid (AGA), methylacrylamidoglycolic methyl ester (MAGME), N-methylolacrylamide (NMA), N-methylolmethacrylamide (NMMA), N-methylolallyl carbamate, alkyl ethers such as the isobutoxy ether or esters of N-methylolacrylamide, of N-methylolmethacrylamide and of N-methylolallyl carbamate. Also suitable are monomers having hydroxyl or carboxyl groups, examples being hydroxyalkyl esters of methacrylic acid and of acrylic acid such as hydroxyethyl acrylate, hydroxyethyl methacrylate, hydroxypropyl acrylate, hydroxypropyl methacrylate, hydroxybutyl acrylate or hydroxybutyl methacrylate, and also 1,3-dicarbonyl compounds such as acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate and allyl acetoacetate. Further examples of auxiliary monomers are epoxide-functional comonomers such as glycidyl methacrylate, glycidyl acrylate, allyl glycidyl ether, vinyl glycidyl ether. Examples of auxiliary monomers also include silicon-functional comonomers, such as acryloyloxypropyltri(alkoxy)- and methacryloyloxypropyltri(alkoxy)silanes, vinyltrialkoxysilanes and vinylmethyldialkoxysilanes, preferably with alkyl and/or alkoxy groups each having 1 or 2 carbon atoms, examples being vinyltrimethoxysilane, vinyltriethoxysilane, 3-methacryloyloxy-propyltrimethoxysilane.

Preference is given to homo- or copolymers containing one or more monomers from the group comprising vinyl acetate, vinyl esters of α-branched monocarboxylic acids having 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, 2-propylheptyl acrylate, styrene and butadiene.

More preference is given to homopolymers of vinyl acetate; copolymers of vinyl acetate and ethylene; of vinyl acetate, ethylene and a vinyl ester of α-branched monocarboxylic acids having 9 to 13 carbon atoms; copolymers of vinyl acetate and one or more (meth)acrylic esters of branched or unbranched alcohols having 1 to 18 carbon atoms, especially methyl acrylate, ethyl acrylate, propyl acrylate, n-butyl acrylate, 2-ethylhexyl acrylate, 2-propylheptyl acrylate and optionally ethylene; copolymers of one or more vinyl esters, ethylene and one or more vinyl halides and also optionally further vinyl esters and/or (meth)acrylic esters; copolymers of one or more (meth)acrylic esters of branched or unbranched alcohols having 1 to 18 carbon atoms, such as n-butyl acrylate and 2-ethylhexyl acrylate and/or methyl methacrylate; copolymers of styrene and one or more monomers from the group methyl acrylate, ethyl acrylate, propyl acrylate, n-butyl acrylate, 2-ethylhexyl acrylate; copolymers of 1,3-butadiene and styrene and/or methyl methacrylate and also optionally further acrylic esters; wherein the recited mixtures may optionally also contain one or more of the abovementioned auxiliary monomers.

Particular preference is given to copolymers of one or more vinyl esters with 1 to 50 wt % of ethylene; copolymers of vinyl acetate with 1 to 50 wt % of ethylene and 1 to 50 wt % of one or more further comonomers from the group vinyl esters having 1 to 13 carbon atoms in the carboxylic acid moiety such as vinyl propionate, vinyl laurate, vinyl esters of alpha-branched carboxylic acids having 9 to 13 carbon atoms such as VeoVa9, VeoVa10, VeoVa11; copolymers of one or more vinyl esters, 1 to 50 wt % of ethylene and preferably 1 to 60 wt % of (meth)acrylic ester of branched or unbranched alcohols having 1 to 15 carbon atoms, especially n-butyl acrylate, 2-propylheptyl acrylate or 2-ethylhexyl acrylate; and copolymers of 30 to 75 wt % of vinyl acetate, 1 to 30 wt % of vinyl laurate or vinyl ester of an alpha-branched carboxylic acid having 9 to 13 carbon atoms, and also 1 to 30 wt % of (meth)acrylic ester of branched or unbranched alcohols having 1 to 17 carbon atoms, especially n-butyl acrylate, 2-propylheptyl acrylate or 2-ethylhexyl acrylate, which additionally contain 1 to 40 wt % of ethylene; copolymers of one or more vinyl esters, 1 to 50 wt % of ethylene and 1 to 60 wt % of vinyl chloride and also optionally further vinyl esters and/or (meth)acrylic esters; wherein the polymers may additionally contain the recited auxiliary monomers in the recited amounts, and the recitations in wt % add up to 100 wt % in each case.

Particular preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate; styrene-acrylic ester copolymers with one or more monomers from the group methyl acrylate, ethyl acrylate, propyl acrylate, n-butyl acrylate, 2-ethylhexyl acrylate; vinyl acetate-acrylic ester copolymers with one or more monomers from the group methyl acrylate, ethyl acrylate, propyl acrylate, n-butyl acrylate, 2-ethylhexyl acrylate, 2-propylheptyl acrylate and optionally ethylene; styrene-1,3-butadiene copolymers; wherein the polymers may additionally contain auxiliary monomers in the recited amounts, and the recitations in wt % add up to 100 wt % in each case.

Most preference is given to copolymers with vinyl acetate and 5 to 50 wt %, especially 5 to 25 wt % of ethylene; or copolymers with vinyl acetate, 1 to 50 wt % of ethylene and 1 to 50 wt % of a vinyl ester of α-branched monocarboxylic acids having 9 to 13 carbon atoms; or copolymers with 30 to 75 wt % of vinyl acetate, 1 to 30 wt % of vinyl laurate or vinyl ester of an alpha-branched carboxylic acid having 9 to 13 carbon atoms, and also 1 to 30 wt % of (meth)acrylic ester of branched or unbranched alcohols having 1 to 17 carbon atoms, which additionally contain 1 to 40 wt % of ethylene; or copolymers of vinyl acetate, 1 to 25 wt % of ethylene and 15 to 35 wt % of vinyl chloride; copolymers of styrene and 20 to 50 wt % of 1,3-butadiene; copolymers of styrene and 20 to 50 wt % of methyl acrylate, ethyl acrylate, propyl acrylate, butyl acrylate or 2-ethylhexyl acrylate, wherein the recitations in wt % add up to 100 wt % in each case.

The monomer selection or the selection of the weight fractions for the comonomers is made in effect so as to obtain in general a glass transition temperature Tg of ≤+120° C., preferably −50° C. to +60° C., more preferably −30° C. to +40° C. and most preferably −15° C. to +20° C. The glass transition temperature Tg of the polymers is quantifiable in a known manner using differential scanning calorimetry (DSC). The Tg is also approximately predictable using the Fox equation (Fox T. G., Bull. Am. Physics Soc. 1, 3, page 123 (1956)): $1/Tg = x_1/Tg_1 + x_2/Tg_2 + \ldots + x_n/Tg_n$, where xn is the mass fraction (wt %/100) of monomer n and Tgn is the glass transition temperature, in kelvins, of the homopolymer of monomer n. Tg values of homopolymers are reported in the Polymer Handbook 2nd Edition, J. Wiley & Sons, New York (1975).

The polymers are obtainable in a known manner, as for example by the emulsion polymerization process or by the suspension polymerization process, for example in the presence of emulsifiers or preferably protective colloids, preferably by the emulsion polymerization process. The polymerization temperature is generally in the range from 40° C. to 120° C. and preferably in the range from 60° C. to 90° C. The copolymerization of gaseous comonomers, such as ethylene, is preferably carried out under superatmospheric pressure, generally between 5 bar and 120 bar. The initiation of the polymerization may be effected for example using the customary water-soluble and/or monomer-soluble initiators or redox-initiator combinations for emulsion and/or suspension polymerization. The molecular weight is controllable by employing chain transfer agents during the polymerization.

Protective colloids are employable for stabilization, optionally in combination with emulsifiers. The polymers thus obtainable are preferably in the form of protective colloid stabilized aqueous dispersions.

Customary protective colloids for stabilizing the polymerization batch include, for example, partially or fully hydrolyzed polyvinyl alcohols; polyvinylpyrrolidones; polyvinyl acetals; polysaccharides in water-soluble form such as starches (amylose and amylopectin), celluloses or their derivatives, such as carboxymethyl, methyl, hydroxyethyl or hydroxypropyl derivatives; proteins such as casein or caseinate, soyprotein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers. Said protective colloids are commercially available and are obtainable using methods known to a person skilled in the art.

Preference is given to celluloses or their derivatives or partially or fully hydrolyzed polyvinyl alcohols. It is also preferable to employ two or more protective colloids, especially from 2 to 4 protective colloids. Alternatively, the use of but one protective colloid is also preferable.

Particular preference is given to partially hydrolyzed polyvinyl alcohols having a hydrolysis degree of 80 to 95 mol % and a Hoeppler viscosity, in 4% aqueous solution, of 1 to 40 mPas, especially 3 to 30 mPas (DIN 53015 Hoeppler method at 20° C.)

The polymerization preferably takes place in the presence of 2 to 10 wt %, more preferably 5 to 10 wt % and most preferably 6 to 8 wt %, in each case based on total monomers, of one or more partially hydrolyzed low molecular weight polyvinyl alcohols preferably having a degree of hydrolysis of 80 to 95 mol %, more preferably 85 to 90 mol % and most preferably 87 to 89 mol %, and preferably a Hoeppler viscosity of each preferably 1 to ≤5 mPas and more preferably 2 to 4 mPas (determined to DIN 53015, by the Hoeppler method at 20° C. in 4% aqueous solution).

It is optionally also possible to use partially hydrolyzed high molecular weight polyvinyl alcohols preferably having a degree of hydrolysis of preferably 80 to 95 mol % and preferably, a Hoeppler viscosity, in 4% aqueous solution, of >5 to 40 mPas, more preferably 8 to 40 mPas (DIN 53015 Hoeppler method at 20° C.) in admixture with the partially hydrolyzed low molecular weight polyvinyl alcohols. It is optionally also possible to use fully hydrolyzed high molecular weight polyvinyl alcohols preferably having a degree of hydrolysis of 96 to 100 mol %, especially 98 to 100 mol %, and a Hoeppler viscosity, in 4% aqueous solution, of preferably 10 to 56 mPas (DIN 53015 Hoeppler method at 20° C.) in admixture with the partially hydrolyzed low molecular weight polyvinyl alcohols. The partially hydrolyzed high molecular weight polyvinyl alcohols and/or the fully hydrolyzed high molecular weight polyvinyl alcohols are each preferably employed in an amount of 0 to 4 wt % or 0.1 to 4 wt %, all based on total comonomers.

Preference is also given to modified polyvinyl alcohols, hereinafter also referred to as X-PVOH, having a degree of hydrolysis of 80 to 99.9 mol %, preferably of 85 to 95 mol %, and a Hoeppler viscosity, in 4% aqueous solution, of 1 to 30 mPas (as determined to DIN 53015 at 20° C.). Examples thereof are polyvinyl alcohols bearing functional groups such as acetoacetyl groups. Further examples are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 13 carbon atoms, dialkyl maleates and dialkyl fumarates such as diisopropyl maleate and diisopropyl fumarate, vinyl chloride, vinyl alkyl ethers such as vinyl butyl ether, olefins such as decene, styrene. The proportion of hydrophobic units is preferably in the range from 0.1 to 10 wt %, based on the total weight of the partially hydrolyzed polyvinyl alcohol. Preferred polyvinyl alcohols further include partially hydrolyzed hydrophobicized polyvinyl alcohols obtained by polymer-analogous reaction, for example acetalization of the vinyl alcohol units with C1 to C4 aldehydes, such as butyraldehyde. The proportion of hydrophobic units is preferably in the range from 0.1 to 10 wt %, based on the total weight of the partially hydrolyzed polyvinyl acetate. The hydrolysis degree is from 80 to 99.9 mol %, preferably 85 to 95 mol %, the Hoeppler viscosity (DIN 53015 Hoeppler method, 4% aqueous solution) is in the range from 1 to 30 mPas, preferably from 2 to 25 mPas. Mixtures of these polyvinyl alcohols are also employable.

Preference is also given to the so-called E-PVOH polyvinyl alcohols, which contain ethylene units and are known, for example, by the trade name of EXCEVAL®. E-PVOHs are partially or preferably fully hydrolyzed copolymers of vinyl acetate and ethylene. Preferred E-PVOHs have an ethylene content of 0.1:12 mol %, preferably 1 to 7 mol %, more preferably 2 to 6 mol % and especially 2 to 4 mol %. The mass-average degree of polymerization is in the range from 500 to 5000, preferably in the range from 2000 to 4500 and more preferably in the range from 3000 to 4000. The degree of hydrolysis is generally greater than 92 mol %, preferably in the range from 94.5 to 99.9 mol % and more preferably in the range from 98.1 to 99.5 mol %. It is optionally also possible to employ one or more E-PVOH ethylene-modified polyvinyl alcohols alone or in combinations with one or more of the abovementioned polyvinyl alcohols.

The polyvinyl alcohol fraction is wholly included in the initial charge prior to the polymerization, or wholly added during the polymerization, or partly included in the initial charge and partly added. The polyvinyl alcohol fraction may also be admixed partly before or during the polymerization and the balance admixed subsequently after completion of the polymerization, subject to the proviso that the proportion admixed before or during the polymerization is at least 2 wt %, preferably at least 4 wt %, both based on total comonomers.

Optionally, emulsifiers are additionally usable in the polymerization, for example at from 0.1 to 2.0 wt %, based on total comonomers. Preferably, no emulsifiers are used during the polymerization nor are any emulsifiers admixed subsequently. The polymers are preferably not emulsifier stabilized. More preferably, the polymers in the form of water-redispersible powders or the carpet coating compositions contain no emulsifiers.

Examples of emulsifiers are anionic, cationic or nonionic emulsifiers, such as anionic surfactants, such as alkyl sulfates having a chainlength of 8 to 18 carbon atoms, alkyl or alkylaryl ether sulfates having 8 to 30 carbon atoms in the hydrophobic moiety and up to 40 ethylene oxide or propylene oxide units, alkyl or alkylaryl sulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units. Emulsifiers are generally used in amounts from 1 to 5 wt %, based on total monomers. Polymerization without addition of emulsifiers is preferred.

The aqueous dispersions thus obtainable have a solids content of preferably 30 to 75 wt %, more preferably 50 to 60 wt %.

To convert the polymers into water-redispersible polymer powders, the dispersions may be dried, for example via fluidized bed drying, freeze drying or spray drying, optionally after addition of drying auxiliaries. The dispersions are preferably spray dried. Spray drying may be carried out in customary spray dryers, in which case atomization may be effected using nozzles for one, two or more fluids or a rotating disk. The choice of exit temperature is generally made in the range from 45° C. to 120° C., preferably 60° C. to 90° C., according to dryer, resin Tg and the desired degree of drying. The viscosity of the nozzlefeed is established via the solids content such that a value of <500 mPas (Brookfield viscosity at 20 revolutions and 23° C.), preferably <250 mPas is obtained. The solids content of the dispersion to be nozzle atomized is >35%, preferably >40%.

The drying auxiliary is generally used in a total amount of 0.5 to 30 wt %, based on the polymeric constituents of the dispersion. Suitable drying auxiliaries include, for example, protective colloids, preferably the protective colloids mentioned above. Particular preference is given to polyvinyl alcohols, especially with a Hoeppler viscosity, in 4% aqueous solution, of 1 to 40 mPas, more preferably 4 to 25 mPas and most preferably 4 to 13 mPas (DIN 53015 Hoeppler method at 20° C.)

The total amount of protective colloid is preferably in the range from 1 to 30 wt %, more preferably in the range from 3 to 20 wt % and most preferably in the range from 5 to 10 wt %, based on the total weight of the polymeric constituents of the dispersion, or based on the total weight of the water-redispersible polymer powders.

Nozzle atomization will frequently be found to benefit from a presence, at up to 1.5 wt %, of antifoam, based on the base polymer. To the powder may also be added an antiblocking (anticaking) agent, preferably at from 0.3 to 30 wt % and more preferably at from 0.3 to 15 wt %, based on total polymeric constituents. Antiblocking agents are useful for example to enhance the storability of the powders by improving their blocking resistance, especially in the case of powders of low glass transition temperature. Examples of antiblocking agents are calcium carbonate, magnesium carbonate, talc, plaster, silica, for example fumed silica, precipitated silica or hydrophobic modified silica, kaolins, such as metakaolin, or silicates. Silicas, silicates, kaolins and chalks are preferred antiblocking agents. The particle sizes of the antiblocking agents are preferably in the range from 150 nm to 40 µm, more preferably in the range from 200 nm to 5 µm and most preferably in the range from 500 nm to 3 µm (as determined using a Coulter LS—Tornado Dry Powder System).

The polymers are preferably employed in the form of protective colloid stabilized water-redispersible polymer powders.

The invention further provides carpet coating compositions prepared from one or more polymers based on ethylenically unsaturated monomers in the form of water-redispersible powders (polymer powder),
100 to 1400 wt % of fillers, based on the weight of the polymer powder,
water,
optionally one or more additives and optionally one or more added substances.

The carpet coating compositions are useful for consolidating carpets, for example continuous-sheet products or carpet tiles.

The solids content of the carpet coating compositions is preferably in the range from 72 to 83 wt % and more preferably in the range from 75 to 80 wt %, all based on the total weight of the carpet coating compositions. The carpet coating compositions have a Brookfield RV viscosity of preferably ≤7000 mPas, more preferably ≤3000 mPa s (measured with Brookfield RV measuring instrument using spindle 4, 20 rpm, at 25° C.) in the absence of additives or added substances.

Suitable fillers include, for example, kaolin, talcum, fluorite, fly ash, aluminum trihydrate, preferably chalk.

Examples of additives are thickening agents, such as polyacrylates or cellulose ethers, or foaming auxiliaries. Foaming auxiliaries are preferably admixed for foam application. Thickeners may be admixed to establish the target viscosity of the carpet coating compositions. The amount needed for this is generally in the range from 0.1 to 6 wt % and preferably in the range from 1 to 3 wt %, all based on the polymer powder. It is preferably this method which is used to establish a Brookfield viscosity of 2000 to 10,000 mPas (measured with Brookfield RV measuring instrument using spindle 4, 20 rpm, at 25° C.). However, the procedure of the invention also makes it possible to eschew thickening agents.

Customary added substances include, for example, dispersants, wetting agents, pigments, hydrophobicizing agents or biocides, such as formaldehyde depot compounds, isothiazolinones, phenols or quaternary ammonium compounds. The polymer powders and/or the carpet coating compositions are preferably free from biocides.

The carpet coating compositions contain from 100 to 1400 parts by weight of filler per 100 parts of polymer powder. This is also referred to as a fill level of 100% to 1400%. The amount of filler in the formulation may vary according to the coating properties desired. The higher the filler fraction (fill level), the lower the mechanical properties are.

The carpet coating compositions of the present invention are notable for a high level of filler compatibility. Namely, carpet coating compositions are now obtainable which consist of polymer powder, fillers and water, for example, and combine fill levels of 400 wt % to 1400 wt % of filler, based on the polymer powder used, and a solids content of 75 to 85 wt % with a Brookfield RV viscosity of <7000 mPas and more preferably of <3000 mPas (measured with Brookfield RV measuring instrument using spindle 4, 20 rpm, at 25° C.)

When the viscosity of a carpet coating composition before admixing the thickening agent is higher, the incorporation times for the filler are unacceptably long on an industrial scale, and there is a risk of forming undispersed clumps of filler that are able to destroy the carpet fabric.

The precoat preferably utilizes carpet coating compositions having fill levels of 300 to 1400%. Fill levels are preferably in the range from 600 to 1000% for precoats for residential applications and from 300 to 600% for commercial applications such as offices, hotels or ships.

The secondary coating preferably utilizes carpet coating compositions with fill levels of 275 to 600% for residential applications and 200 to 275% for commercial applications such as offices, hotels or ships.

In a possible procedure for producing the carpet coating compositions, the polymer powders are redispersed in water and then fillers are stirred in. Alternatively, the polymer powders and fillers may also be introduced into water in a spatially separate but temporally conjoint manner. It is finally also possible first to prepare a drymix comprising polymer powder, fillers and optionally additives and also optionally added substances. Such drymixes can then be mixed with water to produce carpet coating compositions. Any additives and added substances may generally be admixed at any stage, preferably before admixture of fillers. The established carpet coating composition production equipment with which a person skilled in the art is familiar is suitable for producing the carpet coating compositions.

The invention further provides carpets coated with one or more carpet coating compositions of the invention in the precoat and/or secondary coating.

The carpet coating compositions are advantageously employable using existing processes in existing installations for carpet manufacture.

The carpet coating compositions are useful in the manufacture of tufted carpets, woven carpets or needlefelt carpets.

The carpets obtained according to the invention are surprisingly notable for high mechanical strengths, especially high dry strengths, especially and specifically over carpets produced in a conventional manner by use of aqueous polymer dispersions as a starting material.

Biocides may advantageously be eschewed on employing polymers in carpet coating compositions in the manner of the present invention—in contradistinction to polymer dispersions, which are generally treated with biocides to guard against microbial infestation. Microbial infestation may lead to pH changes, viscosity changes, odor development, discoloration, residue formation, phase separation and generally to loss of technological properties. Preservatives, especially the technologically established group of isothiazolinones, are additionally viewed critically because of their skin-sensitizing properties. On storage, particularly under warm conditions, aqueous polymer dispersions are more prone to form a skin in the storage containers. Polymer skins therefore have to be periodically removed from the storage containers, which subsequently have to be cleaned at some cost and inconvenience. This is another issue which does not arise when polymer powders are employed in the manner of the present invention. In addition, transportation costs for polymer powders are lower than for polymer dispersions, since no water has to be co-transported. Polymer powders further enable more flexible handling of binders in the production of carpet back coatings, since in contradistinction to aqueous dispersions, the use of solids does not lead to the occurrence of incompatibility-based plugging in pipework lines and the switch between binders is simplified.

In the course of employing polymer powder for producing carpet coating compositions in the manner of the present invention, the inventors surprisingly found that there is no need to employ thickening agents to establish the viscosity of the carpet coating compositions—in contradistinction to the corresponding use of polymer dispersions. Applications involving polymer dispersions typically utilize thickener at between 0.3 to 1.5 wt %, based on the formulation. Cutting out the thickener reduces costs and the formulation effort.

In the course of employing polymer powders for producing carpet back coatings in the manner of the present invention, the inventors further found that antiblocking agents can be used to control the viscosity of the carpet coating compositions—making this another reason why the use of thickening agents can be eschewed. Just by varying the amount of antiblocking agent, especially the amount of silica-based antiblocking agent, is it possible to establish the formulation viscosity in a controlled manner, following filler, additive and added-substance admixture, particularly for fill levels >600%.

The examples which follow serve to further elucidate the invention:

Preparation of Vinyl Acetate Copolymers as Aqueous Dispersions

Dispersion 1 (D1)

A nitrogen-purged 590 L pressure reactor was initially charged with the following components:
134.9 kg of deionized water,
75.9 kg of a 20 wt % aqueous solution of a polyvinyl alcohol having an average degree of hydrolysis of 88 mol % and a Hoeppler viscosity of 4 mPas (as determined to DIN 53015, at 20° C., in 4% aqueous solution),
12.5 kg of a 10 wt % aqueous solution of a polyvinyl alcohol having an average degree of hydrolysis of 88 mol % and a Hoeppler viscosity of 23-26 mPas (as determined to DIN 53015, at 20° C., in 4% aqueous solution),
224 kg of vinyl acetate,
0.48 kg of a 1.0 wt % aqueous ammonium iron sulfate solution.

The initial charge was adjusted with 250 mL of formic acid (98 wt %) to pH 4.0.

Under agitation (stirring at 240 rpm), the initial charge was heated up to 55° C. and ethylene was injected up to a pressure of 20 bar. On reaching the temperature of 55° C. and a pressure of 20 bar, the initiator feeds—consisting of an aqueous 3 wt % tert-butyl hydroperoxide solution (TBHP) and an aqueous 5 wt % ascorbic acid solution—were each started at 700 g/h. Once the reaction had started, as was clearly indicated by the increasing reactor internal temperature, the evolving heat of reaction raised the reactor internal temperature to 90° C. and the pressure to 48 bar. The initiator feeds were both reduced to 350 g/h to regulate the reaction heat.

45 minutes after the reaction had begun, a vinyl acetate feed and a polyvinyl alcohol feed were started. Vinyl acetate was fed into the reactor over 90 minutes at a rate of 40 kg/h (=60 kg of vinyl acetate), while the polyvinyl alcohol—consisting of a 10 wt % aqueous solution of a polyvinyl alcohol having an average hydrolysis degree of 88 mol % and a Hoeppler viscosity of 4 mPas (as determined to DIN 53015, at 20° C., in 4% aqueous solution)—was added over 120 minutes at a rate of 14 kg/h (=28.0 kg of aqueous polyvinyl alcohol solution).

Ethylene was reinjected during the polymerization to a target pressure of 44 bar until a total ethylene quantity of 34 kg had been injected.

On completion of the monomer feeds, the initiator feeds were each continued for a further 30 minutes at 1300 g/h, during which the pressure decreased to 20 bar. The batch was subsequently cooled down to 65° C. and transferred into a "pressureless" (low pressure) reactor and postpolymerized therein at a pressure of 700 mbar abs. by admixture of 1 kg of tert-butyl hydroperoxide solution (10 wt % in water) and 2 kg of ascorbic acid solution (5 wt % in water).

Solids content: 58 wt %
Viscosity: 1800 mPas (Brookfield, spindle 2, 20 rpm, 23° C.)
Particle size: Dw 1.0 µm, (Coulter LS)
Glass transition temperature: 15.0° C. (DSC)
Protective colloid: 6.2 wt %, based on comonomers Dispersion 2 (D2)

Like dispersion 1 except for the following monomer ratio: 85 wt % of vinyl acetate and 15 wt % of ethylene.
Solids content: 50 wt %
Viscosity: 350 mPas (Brookfield, spindle 1, 20 rpm, 23° C.)
Particle size: Dw 1.0 µm, (Coulter LS)
Glass transition temperature: 10.0° C. (DSC)
Protective colloid: 6.5 wt %, based on comonomers Dispersion 3 (D3)

Like dispersion 1, except for the following monomer ratio:
77 wt % of vinyl acetate and 23 wt % of ethylene.
Solids content: 54 wt %
Viscosity: 280 mPas (Brookfield, spindle 1, 20 rpm, 23° C.)
Particle size: Dw 1.0 µm, (Coulter LS)
Glass transition temperature: −6.0° C. (DSC)
Protective colloid: 6.3 wt %, based on comonomers Dispersion 4 (D4)

A pressure reactor having a capacity of 600 liters was initially charged with the following components:

| 106 kg | of water, |
| 55 kg | of a 20 wt % aqueous solution of a partially hydrolyzed polyvinyl alcohol having a degree of hydrolysis of 88 mol % and a Hoeppler viscosity of 4 mPas (as determined to DIN 53015 at 20° C. in 4 wt % aqueous solution), |
| 51 g | of formic acid (85 wt % in water), |
| 552 g | of iron ammonium sulfate solution (1 wt % in water). |

The reactor was evacuated. Then, 111 kg of vinyl acetate and 41 kg of vinyl chloride were added to the initial charge. The reactor was then heated up to 55° C. and pressurized with ethylene to 53 bar (which corresponds to 42 kg of ethylene). The polymerization was started by starting the metered addition of a 3 wt % aqueous potassium persulfate solution and of a 1.5 wt % aqueous sodium hydroxymethanesulfinate solution (Bruggolite) each at a rate of 4.3 kg/h.

30 minutes after the polymerization had started, a monomer mixture consisting of 55 kg of vinyl acetate and 28 kg of vinyl chloride was added over 2.5 hours. An aqueous feed consisting of 33 kg of the aforementioned 20 wt % polyvinyl alcohol solution and 17 kg of water was likewise added over a period of 2.5 h, at a rate of 20 kg/h, starting 30 minutes after the start of the reaction. On completion of the monomer and aqueous feeds, the initiator feeds were continued for a further 90 minutes in order to fully polymerize the batch. Overall polymerization time was 5 hours. To separate off excess ethylene and vinyl chloride, the dispersion was subsequently transferred into the "pressureless" (low pressure) reactor, in which a pressure of 0.7 bar abs. was applied, and postpolymerized therein by admixture of 1.6 kg of a 10 wt % aqueous t-butyl hydroperoxide solution and 1.6 kg of a 5 wt % aqueous sodium hydroxymethanesulfinate solution (Bruggolite). The pH was adjusted to 5 by admixture of 10 wt % aqueous sodium hydroxide solution. The batch was finally discharged from the "pressureless" reactor through a 250 µm sieve.

Solids content: 55 wt %
Viscosity: 350 mPas (Brookfield, spindle 2, 20 rpm, 23° C.)
Particle size: Dw 0.750 µm, (Coulter LS)
Glass transition temperature: 15° C. (DSC)
Protective colloid: 6.0 wt %, based on comonomers
Dispersion 5 (D5)

A nitrogen-purged 472 L pressure reactor was initially charged with the following components:

| 96.6 kg | deionized water, |
| 16.0 kg | of a 20 wt % aqueous solution of a polyvinyl alcohol having an average degree of hydrolysis of 88 mol % and a Hoeppler viscosity of 4 mPas (as determined to DIN 53015, at 20° C., in 4% aqueous solution), |
| 32.0 kg | of a 20 wt % aqueous solution of a partially hydrolyzed copolymer of vinyl acetate and VeoVa ®10, having a degree of hydrolysis of 88 mol %, a Hoeppler viscosity of 4 mPas (as determined to DIN 53015, at 20° C., in 4% aqueous solution), which created a surface tension of 37 mN/m when dissolved in water at 2 wt %, |
| 39.9 kg | of n-butyl acrylate, |
| 39.9 kg | of styrene, |
| 0.62 kg | of a 1.0 wt % aqueous ammonium iron sulfate solution. |

The initial charge was adjusted with 900 mL of formic acid (10 wt %) to pH 4.0.

Under agitation (stirring at 75 rpm) the initial charge was heated up to 30° C. On reaching the temperature of 30° C., the initiator feeds—consisting of an aqueous 1 wt % of tert-butyl hydroperoxide solution (TBHP) and an aqueous 1.5 wt % sodium hydroxymethanesulfinate solution (Bruggolite)—were each started at 2.2 kg/h. Once the reaction had started, as was clearly indicated by the increasing reactor internal temperature, the evolving heat of reaction raised the reactor internal temperature to 70° C. in the course of 50 min.

40 minutes after the reaction had begun, a styrene feed and a butyl acrylate feed were started. The two monomers were in fact conjointly fed into the reactor over 150 minutes at a rate of 32 kg/h (=80 kg of monomer consisting of 40 kg of styrene and 40 kg of n-butyl acrylate).

On completion of the monomer feed, the initiator feeds were continued for a further 90 minutes at 2.2 kg/h. The batch was then cooled down to 45° C. and transferred into a "pressureless" (low pressure) reactor and postpolymerized therein at a pressure of 700 mbar abs. by admixture of 1.5 kg of tert-butyl hydroperoxide solution (10 wt % in water) and 2.7 kg of sodium hydroxymethanesulfinate solution (Bruggolite) (10 wt % in water).

Solids content: 51.2 wt %
Viscosity: 1600 mPas (Brookfield, spindle 3, 20 rpm, 23° C.)
Particle size: Dw 1.2 µm, (Coulter LS)
Glass transition temperature: 20° C. (DSC)
Protective colloid: 6.0 wt %, based on comonomers
Dispersion 6 (D6)
Vinyl Chloride Copolymer:

A pressure reactor having a capacity of 570 liters was initially charged, in the pre-evacuated state, with the following components:

| 66.9 kg | of water, |
| 6.3 kg | of a 20 wt % aqueous solution of a partially hydrolyzed polyvinyl alcohol having a degree of hydrolysis of 88 mol % and a Hoeppler viscosity of 4 mPas (as determined to DIN 53015 at 20° C. in 4 wt % aqueous solution), |
| 40 g | of formic acid (10 wt % in water), |
| 15 g | of iron ammonium sulfate (100 wt %). |

The reactor was re-evacuated and the stirrer started up at 200 rpm. The reactor was then heated up to 65° C. while ethylene was metered into the initial charge up to an ethylene pressure of 75 bar (which corresponds to 41.8 kg of ethylene). The polymerization was started by starting to feed a 10 wt % aqueous t-butyl hydroperoxide solution (TBHP) at 1.9 kg/h and a 5 wt % aqueous sodium hydroxymethanesulfinate solution (Bruggolite) at a rate of 3.7 kg/h.

5 minutes after the polymerization had started, comonomers—consisting of 177.6 kg of vinyl chloride and 31.3 kg of vinyl laurate—were each added over 4.5 hours at rates of 39.5 kg/h and 7 kg/h respectively. An aqueous feed consisting of 108.6 kg of the aforementioned 20 wt % polyvinyl alcohol solution and 54.4 kg of water was likewise added over a period of 4.5 h, at a rate of 36.2 kg/h, starting 5 minutes after the start of the reaction. On completion of the monomer and aqueous feeds, the initiator feeds were continued for a further 60 minutes in order to fully polymerize the batch. Overall polymerization time was 5.5 hours. To separate off excess ethylene and vinyl chloride, the dispersion was subsequently transferred into the "pressureless" (low pressure) reactor, in which a pressure of 0.7 bar abs. was applied, and postpolymerized therein by admixture of 3.4 kg of a 10 wt % aqueous t-butyl hydroperoxide solution and 5.9 kg of a 5 wt % aqueous sodium hydroxymethanesulfinate solution (Bruggolite). The pH was adjusted to 5 by admixture of 10 wt % aqueous sodium hydroxide solution.

The batch was finally discharged from the "pressureless" reactor through a 250 μm sieve.
Solids content: 52 wt %
Viscosity: 700 mPas (Brookfield, spindle 2, 20 rpm, 23° C.)
Glass transition temperature: 5° C. (DSC)
Protective colloid: 9.2 wt %, based on comonomers
Preparation of Polymers as Water-Redispersible Powders (Polymer Powder)

Dispersions D1 to D6 were each admixed with 2.0 wt %, based on the polymer content of the particular dispersion (solids/solids), of a partially hydrolyzed polyvinyl alcohol having a degree of hydrolysis of 88 mol % and a Hoeppler viscosity of 13 mPas and 6.5 wt %, based on the polymer content of the particular dispersion (solids/solids), of a partially hydrolyzed polyvinyl alcohol having a degree of hydrolysis of 88 mol % and a Hoeppler viscosity of 4 mPas (each determined to DIN 53015 at 20° C. in 4% aqueous solution).

This was followed by spray drying, in a manner established per se, using an inlet temperature of 130° C. and an outlet temperature of 80° C., to obtain the particular copolymer in the form of a water-redispersible powder. The powders were admixed with 3 wt % of kaolin and 14 wt % of calcium carbonate as anticaking agents, each based on dry powder.

The following powders P1 to P6 were obtained:
powder 1 (P1): from dispersion D1;
powder 2 (P2): from dispersion D2;
powder 3 (P3): from dispersion D3;
powder 4 (P4): from dispersion D4;
powder 5 (P5): from dispersion D5;
powder 6 (P6): from dispersion D6.
Preparation of Carpet Coating Compositions:

COMPARATIVE EXAMPLES

Dispersions D1 to D6 were each used to prepare a carpet coating composition on the basis of the following formulation:
100 parts by weight of the particular dispersion,
450 parts by weight of chalk (Carbocia 80, Carbocia) (filler),
0.5 part by weight of foaming auxiliary (sodium lauryl sulfate).

The particulars in parts by weight are based on the dry weight of the particular carpet coating composition.
Water was added in an amount so as to obtain carpet coating compositions having a solids content of 81.5%.
A carpet coating composition was prepared by initially charging the water and the particular dispersion and under agitation admixing the filler and thereafter the foaming auxiliary.
The carpet coating compositions had a solids content of 81.5% and a fill level of 450 wt %.

A final viscosity of 6500 mPas (measured with Brookfield RV measuring instrument using spindle 4, 20 rpm, at 25° C.) was then established by admixing a thickening agent (Matco TR 10 acrylate thickener, from Matco) or dilution water. Final viscosities of 6000 to 7000 mPas are acceptable, in general. The thickener quantities included in the carpet coating compositions are shown in table 1.

EXAMPLES

The powders P1 to P6 were each used to prepare a carpet coating composition on the basis of the following formulation:
100 parts by weight of the particular powder based on polymer,
430 parts by weight of chalk (Carbocia 80, Carbocia) (filler),
0.5 part by weight of foaming auxiliary (sodium lauryl sulfate).

The particulars in parts by weight are based on the dry weight of the carpet coating composition.
The combined amount between the antiblocking agents of the particular powder and the fillers thus corresponded to the filler quantity of the comparative examples involving D1 to D6. Water was added in an amount so as to obtain carpet coating compositions having a solids content of 81.5%.
A carpet coating composition was prepared by charging the water, dispersing the particular powder therein for 5 min and subsequently admixing with the filler and the foaming auxiliary. No thickening agent was added.
The carpet coating compositions each had a fill level of 450%.

A final viscosity of 6500 mPas (measured with Brookfield RV measuring instrument using spindle 4, 20 rpm, at 25° C.) was established similarly to the comparative example. Final viscosities of 6000 to 7000 mPas are acceptable, in general.
Production of Carpets:

The particular carpet coating composition described above was frothed up for 3 minutes using a kitchen appliance to foam densities of 950 to 1015 g/l.

A Helsinki style greige loop pile tufted carpet from Edel (100% polyamide; 550 g/m$^2$ pile weight) 38 cm×33 cm in size was uniformly precoated with 148 g of the particular frothed carpet coating composition.

This was followed by the application, and uniform spreading, of 60 g of the particular frothed carpet coating composition as a secondary coating. A textile backing (Action Back polypropylene weave) was then placed on top and worked in twice with a 1.6 kg roller without pressure. Drying was done in an oven at 130° C. for 20 minutes.
Measurement of Tuft Withdrawal Force:

Testing of the tuft withdrawal force was done in accordance with ISO 4919 using a Zwick tester at 20° C. and 65% relative humidity. The particular carpet was clamped in the top part on the base of the measuring device and a needle was threaded into a carpet loop. The force needed to pull a loop out of the carpet was determined on ten different carpet loops. The mean of the measured results was reported as the tuft withdrawal force. The results are summarized in table 1. To determine the wet tuft withdrawal force, samples as prepared for determining the dry tuft withdrawal force were placed in water for 10 min and, before further testing, surficially dabbed dry and thereby freed of surplus water.

The tuft withdrawal force is a measure of the tuft bind provided by the precoat and of the wear properties of the carpet surface.
Measurement of Delamination Resistance:

Delamination resistance was determined in accordance with DIN EN ISO 11857 using a Zwick tester at 20° C. and 65% relative humidity. Three samples were prepared by cutting strips 5 cm wide and 20 cm long out of the particular carpet in the machine direction and delaminated by hand on the narrow side over a length of 5 cm. Each incipiently delaminated sample was clamped into a Zwick tester and the secondary backing was separated from the carpet at a rate of 300 mm/min. The overall mean of five samples was determined in accordance with DIN EN ISO 11857 from the means of the peak values of each sample in the admissible range of measurement. In effect, the first 25% of the particular measuring curve was marked and ignored for the purposes of evaluation. The next 50% of the diagram trace were divided into 5 equal sections and for each of which the particular peak value was determined. The peak values were used to calculate a mean and the means were in turn used to calculate the overall mean. Delamination resistance was reported in newtons [N].

To determine the wet delamination resistance, samples as prepared for determining the dry delamination resistance were placed in water for 10 min and, before further testing, surficially dabbed dry and thereby freed of surplus water. The results are summarized in table 1.

TABLE 1

Performance characteristics of carpet coating composition:

| | $Tg^{a)}$ [° C.] | Delamination resistance dry [N] | Tuft withdrawal force dry [N] | wet [N] | Thickener$^{b)}$ [g/600 g] |
|---|---|---|---|---|---|
| D1 | 16 | 42.0 | 37.1 | 18.5 | 5 |
| D2 | 10 | 53.5 | 39.4 | 15.1 | 2 |
| D3 | −7 | 32.3 | 42.9 | 19.5 | 7 |
| D5 | 20 | 50.5 | 47.2 | 17.9 | 1 |
| D6 | 5 | 34.9 | 34.2 | 15.5 | 1 |
| P1 | 16 | 36.7 | 48.9 | 21.9 | — |
| P2 | 10 | 42.4 | 49.7 | 16.4 | — |
| P3 | −7 | 28.6 | 53.5 | 20.9 | — |
| P5 | 20 | 49.5 | 48.5 | 19.9 | — |
| P6 | 5 | 32.9 | 47.2 | 19.7 | — |

$^{a)}$glass transition temperature of polymers (determined via DSC);
$^{b)}$g of thickening agent (Matco TR 10 acrylate thickener, Matco) per 600 g of coating material in the wet state.

As is clear from table 1, tuft withdrawal values are higher with the use of polymer powders than with the corresponding dispersions. The difference in the tuft withdrawal values is on the order of 20%. The measurements of wet tuft withdrawal reveal unexpectedly high tuft withdrawal values for polymer powders, even though there was reason to believe on the basis of the drying auxiliary and the antiblocking agent that the influence of water would cause a severe collapse in the characteristic tested.

Influence of Antiblocking Agent on Performance Characteristics:

Powders P7 and P8 were prepared similarly to powder P2 except that the Bindzil 2040 (Silica, trade name of Akzonobel) quantities reported in table 2 were additionally added in the spray-drying process as an additional antiblocking agent.

P7 and P8 were each used to prepare a carpet coating composition as described for P2 except that the amounts of dilution water which are reported in table 2 were added in order to attain the 6500 mPas target viscosity after filler admixture and foaming auxiliary. Final viscosities of 6000 to 7000 mPas are acceptable, in general.

The dilution water also serves to indicate the increased viscosity. The rule is: the higher the water requirements, the higher the formulation viscosity is for the same fill level. The carpet coating compositions thus obtained were used to produce carpets for testing in the same manner as described for P2. The results of the testing are summarized in table 2.

TABLE 2

Influence of antiblocking agent on performance characteristics of carpets:

| | Bindzil$^{a)}$ [pbw] | Dilution water$^{b)}$ [g] | Delamination resistance dry [N] | Tuft withdrawal force wet [N] |
|---|---|---|---|---|
| P2 | — | 3.1 | 42.4 | 16.4 |
| P7 | 2.4 | 4.5 | 45.2 | 18.9 |
| P8 | 8.6 | 7.8 | 50.5 | 19.2 |

$^{a)}$Bindzil 2040 (Silica, trade name of Akzonobel); the stated parts by weight (pbw) are based on the formulation for preparing the powders (dry/dry);
$^{b)}$the stated amount of dilution water is based on 100 g of the wet weight of the carpet coating composition.

Table 2 reveals that antiblocking agents can surprisingly be used to increase the delamination resistance or the tuft withdrawal force after wet aging. It was additionally found that the amount of antiblocking agent in the dispersion powder can be used to establish the viscosity of the coating material in that higher antiblocking agent quantities lead to higher viscosities. This dependence is expressed by the increasing water requirements in g/100 g of formulation following admixture of filler and foaming auxiliary. The acceptable viscosity range from 6000 to 7000 mPas is then attainable by admixture of water, which influences the overall solids content of the coating material. The amount of antiblocking agent added can be used, if necessary without additional admixture of the acrylate thickener typically used, to achieve/establish the target viscosity required for the particular carpet back coating.

Measurement of Tensile Properties for Filled Grades of Polymer Film:

The following formulations were prepared for the purpose of testing the tensile properties of filled grades of polymer film:

100 parts by weight (dry weight) of D3, D2, P3 or P2, 450 parts by weight of chalk (Carbocia 80, Carbocia) (filler), 2.77 parts by weight of defoamer (Agitan P 800, BASF). The particulars in parts by weight are based on the dry weight of the carpet coating composition.

The defoamer served to form filled grades of polymer film which were free of bubbles. The formulation had a fill level of 450 wt %.

The formulations were prepared by initially charging water in an amount such that the formulation composition reached a solids content of 81.5% following admixture of the abovementioned components. In this context, powders were regarded as a dry component. The initial charging of water was followed under agitation (propeller stirrer at 900 rpm) first by initially charging either the powder P2 or P3 or, on the other hand, the dispersion D2 or D3 together with the defoamer and, after an incorporation period of 10 minutes, filling up with chalk. The incorporation of chalk was followed by a further 30 minutes of stirring. The formulation material was drawn down on a glass pane using a doctor blade so as to achieve the layer thicknesses given in table 3. The predrying at 23° C. and 50% relative humidity took one day.

The predried filled grades of polymer film were aged in a drying cabinet at 60° C. for 7 days and then under standard conditions for 7 days (7 d 60° C.+7 d SC) (dry aging). Standard conditions were 23° C. and 50% relative humidity.

For wet aging, the samples dry-aged as just described were immediately thereafter placed in water for 10 min and, prior to further testing, surficially dabbed dry (7 d 60° C.+7 d SC+10 min wet).

To test the filled grades of polymer film, tensile tests were carried out in accordance with DIN 53504 using S3a (small) standard bars (test specimens) at an extension rate of 50 mm/min. The variables measured were the breaking strength (RF) and breaking extension (RD) as terminologically defined in DIN 53504. The results are summarized in table 3.

TABLE 3

Results of tensile tests on filled grades of polymer film:

| | Dry aging | | | Wet aging | | |
|---|---|---|---|---|---|---|
| | film thickness [mm] | RF [N/mm$^2$] | RD [%] | film thickness [mm] | RF [N/mm$^2$] | RD [%] |
| D3 | 1.25 | 2.8 | 22.70 | 1.18 | 1.46 | 15.12 |
| D2 | 1.40 | 5.9 | 9.62 | 1.29 | 2.73 | 2.43 |
| P3 | 1.38 | 1.3 | 0.23 | 1.34 | 1.40 | 4.52 |
| P2 | 1.43 | 5.4 | 2.37 | 1.41 | 1.86 | 0.97 |

Table 3 reveals that the breaking extension and the breaking strength are higher for the comparative dispersions than for the corresponding polymer powders following dry aging (7 d 60° C.+7 d SC). This tendency is found to continue after wet aging (7 d 60° C.+7 d SC+10 min wet), albeit to a less pronounced extent. The surprise is that the polymer powders in the carpet back coating formulation do not display any such disadvantage in delamination resistance or tuft withdrawal force (see table 1). On the contrary, the test results shown in table 1 are similar and/or—in respect of the tuft withdrawal force dry—in some instances higher than for the corresponding dispersion. Moreover, in the procedure of the present invention, the use of thickeners can be advantageously eschewed, which represents a formulation and cost advantage in relation to the production of coating materials.

Determination of Filler Compatibility:

The following formulations were employed to determine the filler compatibility of carpet coating compositions:

| | |
|---|---|
| 100 parts by weight | (dry weight) of D1, D3, P1 or P3, |
| 1000 parts by weight | of chalk (Carbocia 80, Carbocia) (filler), |
| 2.0 parts by weight | of lauryl ether sulfate (foaming auxiliary), |
| 1-1.5 parts by weight | of dispersant (Matcodispersant 40, Matco NV.B.V.). |

The particulars in parts by weight are based on the dry weight of the carpet coating composition.

A solids content of 79.0 wt % was established by admixing appropriate amounts of water. The formulations had fill levels of 1000 wt %.

The carpet coating compositions were prepared as described under the heading "Preparation of carpet coating compositions". Dicrylan EM 15 thickening agent (from Huntsman) was then admixed in an amount such that the final viscosities reported in table 4 were attained.

Determination of Filler Compatibility:

The particular formulation was left to stand (without stirring) (at 23° C. in a sealed vessel) for the time reported in table 4, then stirred for 30 s (propeller stirrer at 900 rpm) and thereafter subjected to a measurement of its viscosity (Brookfield RV, spindle 4, 20 rpm, at 25° C.). The results of the measurement are listed in table 4.

It was found that, surprisingly, the use of polymer powders in the manner of the present invention leads to carpet coating compositions that are more consistent in viscosity and hence more compatible with filler and altogether more stable in storage than the corresponding use of polymer dispersions, as shown by the test results in table 5 involving the powders P1 and P3 versus dispersions D1 and D3—and this even though a contrary result should actually have been expected. This is because there had to be a risk that the drying auxiliary introduced into the carpet coating compositions of the invention together with the polymer powder would make their viscosity stability appreciably worse than for the corresponding tests involving polymer dispersions.

It further follows from table 4 that the carpet coating compositions of the present invention are more stable even in highly filled formulations (1000 wt % filler content) than corresponding formulations comprising polymer dispersions. The reason had to be that the presence of a drying auxiliary (polyvinyl alcohol) in the polymer powders would make the formulations of the present invention exhibit distinct changes in formulation viscosity during the 7 days of storage. Such disadvantageous effects were not observed, surprisingly, instead the stability in storage was observed to improve.

TABLE 4

Viscosity stability of carpet coating compositions:

| | Storage [days] | Viscosity [mPa s] |
|---|---|---|
| D1 | 0 | 2900 |
| | 1 | 2640 |
| | 7 | 2720 |
| P1 | 0 | 3030 |
| | 1 | 3130 |
| | 7 | 3100 |
| D3 | 0 | 3390 |
| | 1 | 2940 |
| | 7 | 2750 |
| P3 | 0 | 3490 |
| | 1 | 3500 |
| | 7 | 3430 |

What is claimed is:

1. In a process for manufacturing carpets where a carpet coating composition is applied as a binder, the improvement comprising:

employing a carpet coating composition based on polymers derived from ethylenically unsaturated monomers, and including in the carpet coating composition, one or more polymers supplied in the form of water-redispersible powder(s), selected from the group consisting of:

a) copolymers of one or more vinyl esters with 1 to 50 wt % of ethylene, copolymers of vinyl acetate with 1 to 50 wt % of ethylene and 1 to 50 wt % of one or more further vinyl ester comonomers having 1 to 13 carbon atoms in the carboxylic acid moiety of the ester, b) copolymers of one or more vinyl esters, 1 to 50 wt % of ethylene, and 1 to 60 wt % of (meth)acrylic ester(s) of branched or unbranched alcohols having 1 to 15 carbon atoms, (c) copolymers of 30 to 75 wt % of vinyl acetate, 1-40% ethylene, 1 to 35 wt % of vinyl laurate or vinyl ester(s) of an alpha-branched carboxylic acid having 9 to 13 carbon atoms, and 1 to 30 wt % of (meth)acrylic ester of branched or unbranched alcohols having 1 to 17 carbon atoms,
d) copolymers of one or more vinyl esters, 1 to 50 wt % of ethylene, and 1 to 60 wt % of vinyl chloride, optionally also comprising further vinyl esters and/or (meth)acrylic esters and
e) mixtures thereof,
wherein the amounts in wt % add up to 100 wt % based on the total weight of the respective polymer a) through d).

2. The process of claim 1, wherein the carpet coating compositions are employed in the manufacture of tufted carpets, woven carpets or needlefelt carpets.

3. The process of claim 1, wherein the carpet coating compositions are prepared from one or more polymers based on ethylenically unsaturated monomers in the form of water-redispersible protective colloid-stabilized powders.

4. The process of claim 2, wherein the carpet coating compositions are prepared from one or more polymers based on ethylenically unsaturated monomers in the form of water-redispersible protective colloid-stabilized powders.

5. The process of claim 3, wherein the protective colloid comprises one or more partially hydrolyzed polyvinyl alcohols having a degree of hydrolysis of 80 to 95 mol % and a Hoeppler viscosity of 1 to 40 mPas determined according to DIN 53015, at 20° C., in 4% aqueous solution).

6. The process of claim 3, wherein the protective colloid comprises from 2 to 10 wt % of one or more partially hydrolyzed low molecular weight polyvinyl alcohols having a degree of hydrolysis of 80 to 95 mol % and a Hoeppler viscosity of 1 to ≤5 mPas, and optionally one or more partially hydrolyzed high molecular weight polyvinyl alcohols having a degree of hydrolysis of 80 to 95 mol % and a Hoeppler viscosity >5 to 40 mPas, and optionally one or more fully hydrolyzed high molecular weight polyvinyl alcohols having a degree of hydrolysis of 96 to 100 mol % and a Hoeppler viscosity of 10 to 56 mPas, wherein the weight percents are based on the total weight of the polymers based on ethylenically unsaturated monomers, and the Hoeppler viscosity is determined according to DIN 53015, at 20° C., in 4% aqueous solution.

7. The process of claim 1, wherein one or more polymers based on ethylenically unsaturated monomers are in the form of water-redispersible, optionally protective colloid-stabilized powders containing one or more antiblocking agents selected from the group consisting of carbonates, talcum, plaster, silica, kaolins and silicates.

8. The process of claim 7, wherein the antiblocking agents have particle sizes of 150 nm to 40 µm.

9. The process of claim 1, wherein the polymers in the form of water-redispersible powders or the carpet coating compositions prepared therefrom contain no emulsifiers.

10. The process of claim 1, wherein the carpet coating compositions have a solids content of 72 to 83 wt %, based on the total weight of the carpet coating compositions.

* * * * *